Feb. 17, 1970   J. ESPOSITO   3,495,616
PLUMBING, INCLUDING FAUCET AND COUPLING TO WATER PIPE
Filed Dec. 30, 1966   2 Sheets-Sheet 1

INVENTOR.
James Esposito
BY *[signature]*
ATTORNEY

Feb. 17, 1970   J. ESPOSITO   3,495,616
PLUMBING, INCLUDING FAUCET AND COUPLING TO WATER PIPE
Filed Dec. 30, 1966   2 Sheets-Sheet 2
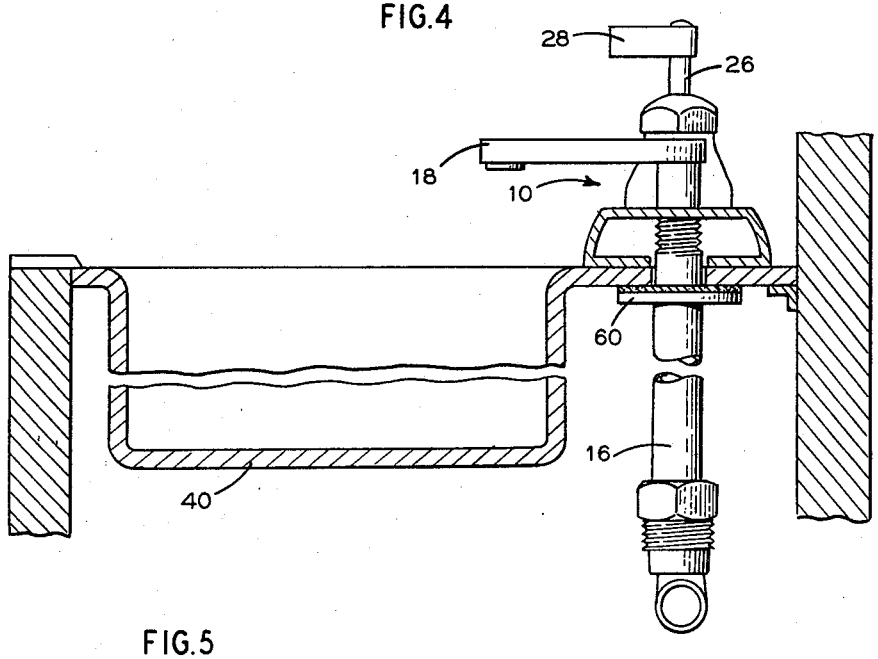
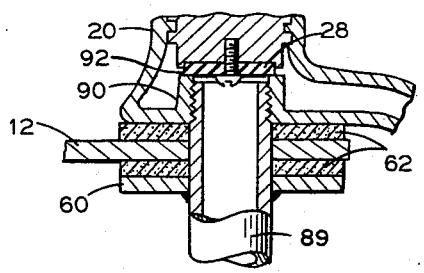
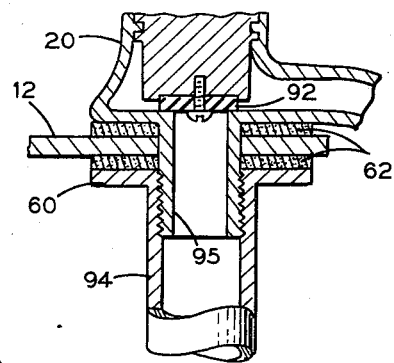
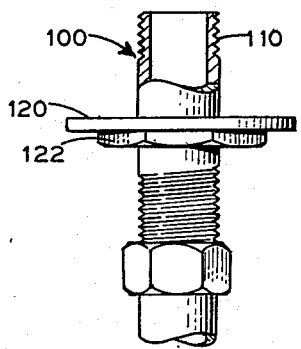
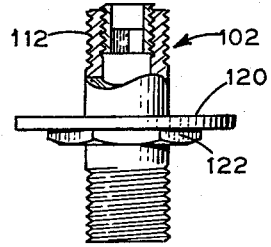
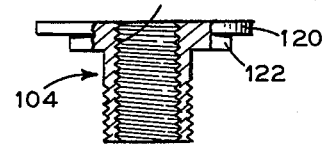
INVENTOR.
James Esposito United States Patent Office 3,495,616
Patented Feb. 17, 1970

3,495,616
PLUMBING, INCLUDING FAUCET AND
COUPLING TO WATER PIPE
James Esposito, 91 Ryerson St.,
Brooklyn, N.Y. 11205
Filed Dec. 30, 1966, Ser. No. 606,259
Int. Cl. E03c 1/04; F16l 5/00
U.S. Cl. 137—356                    12 Claims

ABSTRACT OF THE DISCLOSURE

A sink faucet and coupling combination to be mounted on the deck of a sink, with the coupling serving both for anchoring the faucet and for connecting the faucet to a water supply line.

---

This invention relates to plumbing, including a valve or faucet for water control, and a coupling connection from the faucet to a water supply pipe. The invention is particularly directed to a construction which permits easy application of the faucet to, or removal from, a sink, and particularly, with the same ease of application both for new installations and for substitutions of faucets in regions that are usually not conveniently accessible.

Heretofore, individual or double faucets have been disposed for service by first being positioned on the deck or platform of a sink, with the casing of the faucet seated on the top surface of the sink platform or deck, and a communicating water pipe then connected into the faucet through an opening in the sink platform or deck, after which such faucet and pipe have been anchored to the deck by an external threaded nut adjustably moved along the threaded portion of the connecting pipe or conduit until the nut is forced tight against the undersurface of the deck or platform of the sink. Thus, two elements were necessary, first a conduit for the water, and, second, a tightening nut for anchorage.

In placing a faucet in service on a sink that has one or two tubs positioned with their bottoms lower than but forward of the faucet, it has been inconvenient and difficult to make connections from the water supply pipes to the faucet inlet ports, because of the presence of the tubs and because of the narrow space left between the back surfaces of the tubs and the supporting wall for the sink. Such narrow space has been inconvenient to work in, even with special tools and wrenches for rotating connecting coupling pipes and unions to connect the faucet to its hot and cold water supply pipes. Further, the location of the tubs is usually such as to prevent direct frontal access to the faucet connections.

Thus, where such an external threaded nut, previously referred to, is and must be relied on for anchoring the faucet to the sink, such difficulty, in installation, and later in any servicing, must inevitably exist.

The invention herein provides the same two functions of the conventional plumbing connections to a faucet. First, a water conduit connection is provided from a water supply pipe to the faucet, and, second, an anchoring connection is provided to anchor the faucet to its sink deck or platform.

However, as distinguished from previous practice, the present invention employs a single coupling conduit, having a construction that will provide the two functions. Such coupling conduit, or shank, consists of a tubular conduit having, firstly, a forward end, generally threaded, to threadedly couple to a threaded section of the faucet; and having, secondly, an integral annular flange just behind the front threaded end. As the front end of the coupling conduit threads into or onto an element of the faucet, the integral annular flange limits forward movement of the coupling conduit into or onto the faucet, and the faucet is pulled down tightly onto the top surface of the sink deck, as the annular flange then, simultaneously, wedges tightly frictionally against the lower surface of the sink deck to thereby lock the faucet and the coupling conduit tightly to the sink.

By using a long coupling conduit, sufficiently long enough to extend to a region at a level below the bottom contour level of the tub or tubs, direct frontal access to the coupling conduit is made available, permitting relatively free manual operation of the coupling conduit for threading into the faucet, by applying a turning torque to the lower end of said coupling conduit, and without any restraint that would otherwise be imposed by the shallowness of the space behind the tub or tubs, between such tub or tubs and the supporting wall for the sink.

A primary object of this invention, therefore, is to provide a faucet and coupling assembly for a sink, which assembly may be readily handled and worked on, even within the narrow space behind the tubs, between the tubs and the supporting wall for the sink.

Another object of this invention is to provide a faucet and coupling assembly which may easily and readily be coupled directly, both for water conduit coupling and for physical anchorage on a sink deck, without the use of an external nut, but utilizing only the faucet and the coupling shank.

Another object of this invention is to provide a coupling shank for the double function of connecting a water supply pipe to a faucet, and of directly anchoring the faucet to a sink deck.

Another object of this invention is to provide a coupling conduit or shank for the faucet, in which the need and use for an external nut is obviated and eliminated, by constructing the shank or coupling conduit, first with a threaded front end for direct coupling to a receiving section of the faucet structure, and, second, with an integral annular collar disposed immediately behind the threaded front end and appropriately positioned with respect to the front end and the threaded section of the shank to enable the integral annular collar to tightly wedge into the under surface of the platform or deck of the sink, in order thereby to tightly anchor the faucet casing onto the upper surface of the sink platform or deck, as the threaded front end of the shank is threadedly coupled to the faucet structure, with the lower or rear end of the coupling conduit provided with means for connection to another pipe by a union or the like.

Several modifications of a faucet and shank assembly are disclosed herein, in which the shank structure is of design to couple appropriately to the faucet, to accomplish the two purposes of the shank, first to provide a water path to the faucet, and second to anchor the faucet to the sink.

In a first modification, the upper or front end of the shank is threaded, to thread into a section of a faucet or valve structure, in which a manually-operable valve stem engages or disengages an integral valve seat built-in as a structural element of the faucet. The threaded shank pulls the faucet housing tightly down to the top surface of the platform or deck of the sink, while at the same time, pressing and wedging the annular collar tightly up against the under surface of said platform or deck. A thin layer of putty or a resilient washer between the faucet housing and the sink platform provides a smooth top seal, and a similar thin layer of putty or a resilient washer between the under surface of the platform and the annular collar, provides a smooth bottom seal surface.

Said first modification of the coupling shank may partake of two forms, depending upon the design of the faucet.

If the faucet is provided with its own internal valve seat, as already noted, controlled by a seating washer on the manually-operable valve stem of the faucet, one form of the coupling shank may have its upper end formed merely to provide a threaded coupling portion to couple to the faucet, plus the integral flanges for anchoring the coupling shank and the faucet on a sink deck.

If the faucet is not provided with its own internal valve seat, another form of the coupling shank may be provided at its upper or forward end with a portion formed or shaped and dimensioned to serve as a valve seat for a seating washer on the valve stem of the faucet. The forward end of the coupling shank is also threaded in this case to thread into or onto the faucet, and the shank is provided with the integral flange to engage and wedge into the bottom surface of the sink deck, to lock the faucet in position on the sink deck.

Still another modification or form of the coupling shank is provided for a faucet which both contains its own internal valve seat and has a depending threaded tail piece, to serve to receive a coupling to the water system and, also, to serve to extend through a hole in the sink deck and thereby serve to hold the faucet physically against turning in response to the torque developed during the operation of connecting a threaded pipe to the faucet. This modification of the coupling shank is internally threaded, to fit over the depending tail-piece, and has the associated annular flange at its terminating front end, in front of the internally threaded portion to engage the lower surface of the sink deck. As the threading operation pulls the faucet down tightly against the top surface of the sink deck, the flange wedges tightly against the lower surface of the sink.

That double functional feature of the invention is also employed with old installations, irrespective of the tub presence or disposition, where the old faucet embodied a threaded tail piece. When the faucet has become worn and needs replacement, and a newer type faucet is substituted, a modified tail-piece modified according to the present invention is employed to lock the faucet to the sink and to couple the faucet to the old water pipes, without requiring any change in those old pipes. Such modified tail-piece embodies a front threaded end and a rear threaded end, with a flange disposed intermediate for engaging the under surface of the sink to clamp the faucet in place. In order to permit easy manipulation of this modified tail-piece, the flange is provided with an integral co-axial hexagonal extension between the flange and the rear threaded end.

The construction of the faucet and the shank and the manner in which they function, in accordance with the principles of this invention, are described in the following specification which may be understood when taken and considered in connection with the accompanying drawings in which:

FIG. 4 is a side view, partially in section, showing a faucet clamped to sink deck by a shank coupling of this invention, connected to an external water pipe that is to supply the faucet, and showing also the relative location of the tub;

FIG. 5 is a sectional view of a shank coupling, threaded into a faucet that has its own valve seat;

FIG. 6 is a sectional view of a shank coupling to a faucet that has a depending threaded element or tailpiece inlet;

FIG. 7 is a side sectional view of a tail-piece adapter embodying this invention, and provided with a valve seat;

FIG. 8 is a side sectional view of a tail-piece adapter for a faucet having its own valve seat; and FIG. 9 is a side sectional view of an adapter for a faucet having its own tail-piece extension.

Figure 1:
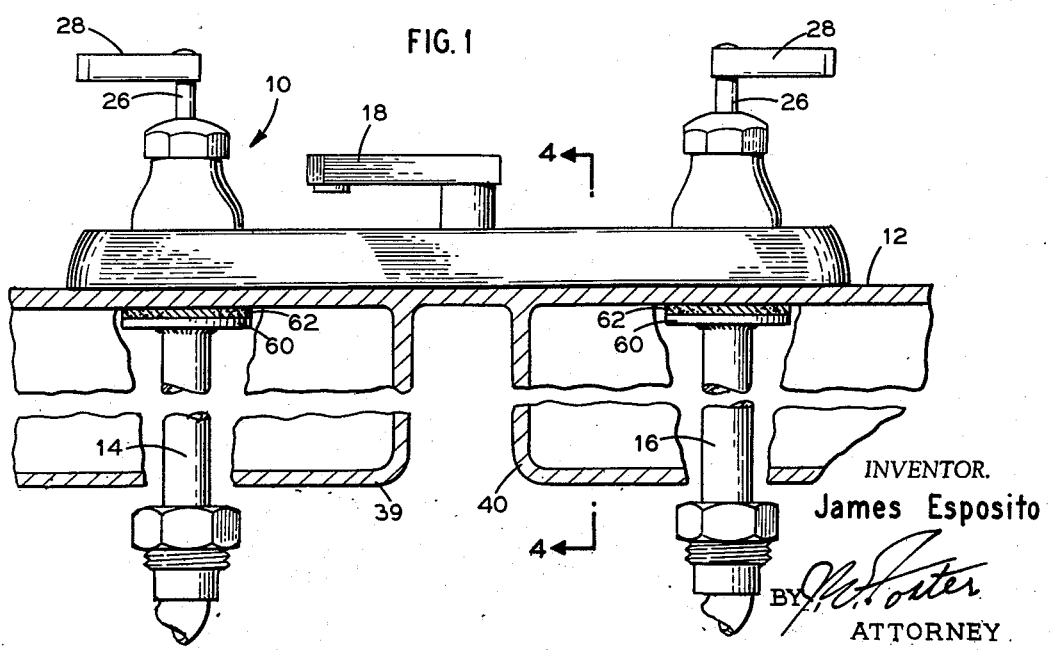
FIG. 1 is a schematic outline view of a faucet in a general application to a sink platform or deck, with anchoring water couplings of this invention.

As shown in FIG. 1, a two-valve faucet 10 is shown mounted on a sink deck or platform 12, through which two water connections are made to the faucet through two shanks 14 and 16 to supply both hot and cold water to the two faucets which may then be mixed in conventional manner to supply a water stream through a common spigot 18.

Figure 2:
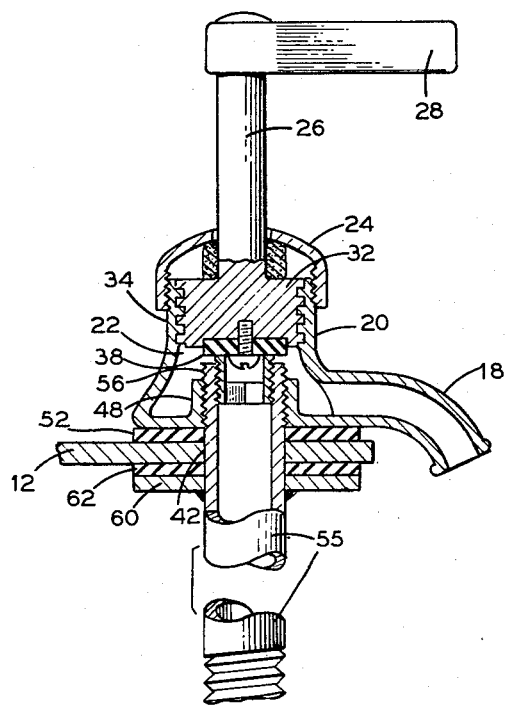
FIG. 2 is a vertical view, partially in section, partially in elevation, of the faucet and shank coupling embodying the principles of this invention.

As shown in FIGURE 2, one faucet or valve connection is shown as embodying a hollow casing 20, having an inner chamber 22 with a cover or cap 24 through which a valve stem 26 extends upwardly to be operated by a manually operable handle 28. The lower end of the valve stem 26 carries a threaded guide head 32 which is threadedly guided in a similarly threaded guide section 34 to assure axial translation of the guide head 32 of the valve stem 26 whose lower end carries a sealing washer 38 which is to perform the valve function, by seating on a valve seat for closure or by moving away from the valve seat to open the space, to control water flow into the space 22 and out through the indicated spigot 18, into either tub 39 or 40.

The location at which the faucet casing 20 will be anchored to the sink is usually predetermined by the location of openings 42 in the deck or platform 12 of the sink on which the faucet is to be mounted, FIGS. 1 and 4, so that access to the faucet canthen be had by means of a connecting pipe or shank thrust through those openings 42 into the faucet structure.

The faucet casing 20 is provided with an internally projecting threaded element 48, which is essentially an inlet port for the faucet casing 20. The faucet is usually positioned so that the axis of that inwardly directed threaded portion 48 will coincide with the axis of opening 42 in the sink deck 12. The faucet casing 20 is shown in FIG. 2 seated on a layer of material which may be putty, or a gasket of rubber or similarly resilient water-repelling material, indicated at 52 in FIG. 2, In order to provide a coupling to the valve casing 20 from an external water supply source, a tubular member or shank 55 is employed which is provided with a threaded upper or front end 56, appropriately threaded to fit into the internally directed threaded element 48, as inlet port, of the valve casing. The shank 55, in accordance with this invention, is further provided with an annular collar 60, as integrally formed on, or equivalently secured to, the shank 55, to serve as a frictionally effective locking element, to tightly press against the under surface of the deck or platform 12 of the sink. If necessary to compensate for any irregularities in the top surface or undersurface of the sink platform or deck 12, the layer of putty or a washer 62 of resilient waterproof material may be employed between the undersurface of the platform or desk 12 and the annular collar 60 integral on the shank. The flange 60, for purpose of illustration, is shown as welded to the shank body 55.

The shank 55 thus serves to tightly anchor the faucet casing 20 on the sink or deck 12 by the interaction between the threaded front end 56 of the shank 55 and the internal threaded element 48 of the valve casing, and the wedging frictional action of flange 60. During such tightening action, the annular collar serves as a reaction element, against the undersurface of sink deck 12, and thereafter the locking friction between the annular collar 60 and the undersurface through a thin layer of putty or the washer 62 against the undersurface of the sink platform or deck 12, holds the collar 60 in tightly fixed position against casual or unwanted displacement. The faucet thus is held locked and anchored in position at the desired location on the top of the sink or deck 12.

The front or top end of the shank 55, for the purpose of the present invention, is provided in the modification in FIG. 2 with an axially flow-through threaded insert 65 with a co-axial extension 66 having an upper concentric annular end 70 having a rounded smooth outer contour to provide a smooth seating surface for the sealing washer 38 supported at the bottom end of the valve stem 26 shown in FIG. 2. Internal flat surfaces 68 in the insert permit the use of an appropriate tool to rotate the insert 65. The location of the insert 65 is predetermined, of course, so that the upper end 70 of the annular seat will be positioned appropriately to be engaged by the sealing washer 38, corresponding to a selected region of the positioning handle 28 for the valve stem.

The provision of the annular collar 60, as a fixed stationary element on the shank 55, is the important feature of this invention, since it permits easy assembly of the faucet on the sink by merely threading the shank 55 into the internal threaded guide section 48 of the casing 20 until the faucet casing 20 is suitably locked to the sink deck 12.

After the faucet is clamped to the sink deck 12 by the shank 55, the lower end of the shank may be coupled to an appropriate water supply pipe by a conventional union, as in FIG. 4. The lower end 55-1 of shank 55 may be threaded, as in FIG. 1, to receive a threaded union, or as shown in FIG. 3, the lower end of the shank may be formed with a spherical section to provide a small amount of angular adjustability.

Subsequently, if for any reason it becomes necessary to replace the faucet, the shank 55 may be easily removed after first disconnecting the lower end of the shank 55 from the water supply pipe to which it is connected.

Another problem that is encountered in the installation of a faucet and its connection to the water supply pipe, arises from the fact that the axis of the water supply pipe and the axis of the tubular connection to the valve casing, may not be co-planar.

Figure 3:
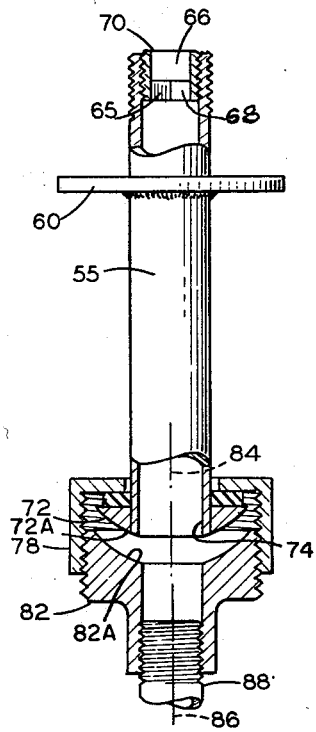
FIG. 3 is a side elevational view, partially in section, illustrating the manner in which a valve seat element is disposed in the upper end of the shank of this invention.

To obviate this difficulty, another feature of the invention is provided in constructing the lower end of the shank 55 in a manner indicated schematically in FIG. 3.

As there shown in FIG. 3, an annular ring 72 is secured to the lower end 74 of the shank 55. The annular ring 72 has an outer contour surface 72–A that is a section of a sphere. A two-piece union consisting of union element 78 and coupler adapter 82 provides an annular concave spherical surface 82a that is also an element of a similar sphere thereby permitting the two elements 72 and 82 to be very closely and conformably seated and coupled, even though the axis 84 of shank 55 may be dis-aligned from the axis 86 of a pipe section 88 constituting part of a water supply pipe.

Any other type of coupling may be employed to connect the lower end of the shank 55 to a water supply pipe.

The installation of the faucet is made easier because of the easier manipulation of the large shank, and, later, when replacement of the faucet may become necessary, the large shank provides easier and greater accessibility for manipulation, even in cramped quarters, to provide access to the faucet and its connections and enables any such work to be done with considerable saving of time over present procedures.

FIG. 4 shows in side view, the disposition of the faucet 10 and one of the shank couplings 16 and the related water supply pipe, for the assembly of FIG. 1.

As previously explained, FIG. 3 shows a shank coupling 55, similar to either 14 or 16 of FIG. 1, with a valve seat at the top or forward end of the coupling 55.

FIG. 5 shows another modification of shank 89, in which the faucet casing 20 is provided with its inlet port section 90 shaped to provide a smooth valve seat 92 to receive the closure washer 38 for closing the valve. Here the shank 55, as before, has the integral flange 60 which clamps the faucet to the sink deck 12. The two putty layers or resilient washers 62 are shown exaggerated in thickness, to indicate their possible use.

FIG. 6 shows a further modification of the shank as structure 94, for use on a faucet having a depending section 95 as an inlet port. Here the shank 94 is internally threaded and fits onto the depending section 95, to pull the faucet tightly onto the sink deck 12, and to lock the faucet tightly in place.

The three modifications shown in FIGS. 3, 5 and 6 are especially suited for new installations, and also for substitutions where old water pipe locations and connections permit.

In some cases, where old piping may be of tubing, and it is desired to retain such tubing as is already in place, modified forms of nipple couplings are provided, embodying this invention.

Such nipple couplings 100, 102 and 104 are shown in FIGS. 7, 8 and 9. Each nipple couple embodies a front threaded element 110, 112 or 114, to engage and to couple to a corresponding inlet port section of the faucet, according to the faucet design. The locking flange 120 is integral on each nipple and in addition each locking flange embodies a multi-faced extension 122 with flat faces to permit rotation of the nipple by a suitable tool, such as a basin wrench. The lower end 130, 132, or 134 of each nipple is appropriately also threaded to receive the old coupling nut or union already on the old piping. Thus, the old piping need not be disturbed, and the coupling connection at the faucet and sink is completed as in the cases of the assemblies in FIGS. 2, 5 or 6.

The invention thus contemplates a faucet and coupling assembly that anchors the faucet to its sink deck, and also establishes its water flow connection, at the same time.

Still other variations might be made in the detail constructions, within the spirit and scope of the invention, as set forth in the claims.

What is claimed is:

1. A sink faucet and coupling combination, to be mounted on the deck of a sink, with the coupling serving both for anchoring the faucet and for connecting the faucet to a water supply line, said combination comprising:

a faucet to be disposed on a sink deck at a location usually determined by a preformed and prelocated opening in the sink deck, said faucet having a hollow casing with a water-receiving chamber, said casing having an outlet element communicating with said chamber, and also having an inlet element also communicating with said chamber, said inlet element embodying a threaded section for receiving an external member for connection to a water supply pipe, and said faucet having means for closing the inlet against the direction of flow;

and an elongated tubular conduit member rigid along its length and symmetrical about its longitudinal axis, and adapted to serve as the coupling between said faucet and an external water supply pipe, said conduit member having a forward end and a rearward end, said forward end having a threaded section to couple to said threaded section of said faucet casing, and said elongated tubular conduit member also having an annular collar integral with and encircling said tubular conduit member adjacent and behind said threaded section of said forward end, said annular collar being for the purpose of, and serving in operation for, pulling said faucet tightly down onto the upper surface of said sink deck and serving further for locking said faucet tightly in such position on said sink deck.

2. A sink faucet and coupling combination, as in claim 1, in which:

said elongated tubular coupling member has its rearward end provided with means for coupling to an external water pipe.

3. A sink faucet and coupling combination, as in claim 1, in which:
   said inlet element, which communicates with the chamber of said hollow casing, consists of a threaded tubular tailpiece to extend into and through an opening in said sink deck and to serve to provide a coupling element for receiving said threaded forward end of said tubular conduit member, which said tubular conduit coupling member serves to pull said faucet tightly onto said sink deck, as said faucet is held against rotation, and said annular collar serves to lock said tubular conduit coupling member also tightly to said sink deck.

4. A faucet and coupling, as in claim 1, in which:
   said tubular conduit coupling member has its forward end externally peripherally threaded and is provided with an annular valve seat at its front facing edge projecting into said faucet casing for engagement by a conventional valve seating washer at the end of a valve stem operable by the usual faucet handle.

5. A faucet and coupling, as in claim 1, for application to a sink having a tub disposed directly in front of the working region adjacent the opening in said sink deck, which region is utilized for applying and mounting the faucet, and whereby such disposition of the tub partially masks and blocks direct access to said working region from the space in front of the sink,
   said faucet and said tubular coupling being characterized by the threaded forward end of the coupling being so dimensioned relative to the threaded length of the receiving section of said inlet element and the annular collar so disposed on the coupling that the faucet casing will be pulled tightly onto the top surface of the sink deck and the annular collar will be wedged tighty against the under surface of the sink deck, as said coupling is threadedly engaged with said inlet element of said casing.

6. A faucet and coupling combination, as in claim 5, in which:
   said tubular coupling is of sufficient length to extend from the faucet to a region below the bottom outer contour of the tub of the sink, whereby the rearward or bottom end of said tubular coupling may be readily accessible from the space in front of said tub at a level below said tub, to permit said tubular coupling to be easily and readily engaged and manipulated by its lower or rearward end, free from the restraints of the restricted space behind said tub.

7. A faucet and coupling, as in claim 5, in which:
   said tubular coupling has a front annular edge facing into said chamber in said hollow faucet casing, to serve as a valve seat for engagement by a conventional valve seating washer at the end of a valve stem operable by the usual faucet handle.

8. A sink faucet and coupling, as in claim 1, in which:
   said tubular conduit member embodies a polygonal structure encircling said member and disposed adjacent and behind said annular collar to serve as a torque-inducing element on said conduit member for manipulating said conduit member in response to an external torque applied thereto.

9. A coupling shank or conduit for use with a faucet, as in claim 1,
   said shank comprising an elongated tubular member having a forward end threaded for coupling onto a similarly threaded element of a faucet, and having an encircling annular collar for wedgingly pressing against a stationary surface of a support for the faucet to lock the faucet securely in place on said support and to lock the shank likewise in place on said support.

10. A coupling shank, as in claim 9,
    said shank embodying, additionally, at the front edge of its forward end, an annularly symmetrical surface to serve as a valve seat to be engaged by a valve-seating washer on a valve stem of the associated faucet.

11. A coupling shank, as in claim 9,
    said shank having a substantial length, to extend from its forward end at the coupling region at the associated faucet to its rearward end at a spaced region beyond any normal structural part of a sink to which said faucet is to be applied, whereby direct access may be available to the rearward end of the shank, free of any interference by the presence of such normal structural part of such sink.

12. A coupling shank, as in claim 9, in which:
    said shank has a back end, behind the annular collar, and threaded to receive a coupling nut for coupling to an external water pipe.

References Cited

UNITED STATES PATENTS

| 1,342,046 | 6/1920 | Heino | 4—288 |
| 2,173,064 | 9/1939 | Judell | 4—187 |
| 1,137,556 | 4/1915 | Von Glahn. | |
| 1,436,027 | 11/1922 | Ferris | 137—359 XR |
| 1,888,359 | 11/1932 | Ritchie | 137—360 XR |

FOREIGN PATENTS 505,853  2/1932  Germany.

HENRY T. KLINKSIEK, Primary Examiner

U.S. Cl. X.R.

4—192